(12) United States Patent
Sekiyama et al.

(10) Patent No.: US 10,782,897 B2
(45) Date of Patent: Sep. 22, 2020

(54) MEMORY REDUCTION FOR NEURAL NETWORKS WITH FIXED STRUCTURES

(71) Applicant: INTERNATIONAL BUSINESS MACHINES CORPORATION, Armonk, NY (US)

(72) Inventors: Taro Sekiyama, Urayasu (JP); Haruki Imai, Yokohama (JP); Jun Doi, Yokohama (JP); Yasushi Negishi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 15/943,079

(22) Filed: Apr. 2, 2018

(65) Prior Publication Data

US 2019/0303025 A1 Oct. 3, 2019

(51) Int. Cl.
| | |
|---|---|
| *G06F 3/06* | (2006.01) |
| *G06N 3/08* | (2006.01) |
| *G06N 3/04* | (2006.01) |
| *G06N 3/063* | (2006.01) |

(52) U.S. Cl.
CPC .......... *G06F 3/0626* (2013.01); *G06F 3/0631* (2013.01); *G06F 3/0673* (2013.01); *G06N 3/08* (2013.01)

(58) Field of Classification Search
None
See application file for complete search history.

(56) References Cited

PUBLICATIONS

"vDNN: Virtualized deep neural networks for scalable, memory-efficient neural network design"; Rhu M, Gimelshein N, Clemons J, Zulfiqar A, Keckler S; 2016 49th Annual IEEE/ACM International Symposium on Microarchitecture (MICRO) (Year: 2016).*
"Training deep nets with sublinear memory cost"; Chen T, Xu B, Zhang C, Guestrin C; Apr. 22, 2016 (Year: 2016).*
Chen et al., "Training Deep Nets with Sublinear Memory Cost", arXiv:1604.06174v2 [cs.LG] Apr. 22, 2016, pp. 1-12.
Chen et al., "MXNet: A Flexible and Efficient Machine Learning Library for Heterogeneous Distributed Systems", arXiv:1512.01274v1 [cs.DC] Dec. 3, 2015, pp. 1-6.

* cited by examiner

*Primary Examiner* — Michael Alsip
(74) *Attorney, Agent, or Firm* — Tutunjian & Bitetto, P.C.; Vazken Alexanian (57) ABSTRACT

A method is provided for reducing consumption of a memory in a propagation process for a neural network (NN) having fixed structures for computation order and node data dependency. The memory includes memory segments for allocating to nodes. The method collects, in a NN training iteration, information for each node relating to an allocation, size, and lifetime thereof. The method chooses, responsive to the information, a first node having a maximum memory size relative to remaining nodes, and a second node non-overlapped with the first node lifetime. The method chooses another node non-overlapped with the first node lifetime, responsive to a sum of memory sizes of the second node and the other node not exceeding a first node memory size. The method reallocates a memory segment allocated to the first node to the second node and the other node to be reused by the second node and the other node.

20 Claims, 7 Drawing Sheets

Output
For i ∈ {4, 5, 6},
    P[i] = new memory   O[i] = 0
For i ∈ {2, 3},
    P[i] = P[5]   O[i] = some offset
For i ∈ {1},
    P[i] = P[6]   O[i] = 0

FIG. 7

MEMORY REDUCTION FOR NEURAL NETWORKS WITH FIXED STRUCTURES

BACKGROUND

Technical Field

The present invention relates generally to memory devices and, in particular, to memory reduction for neural networks with fixed structures.

Description of the Related Art

Neural Networks (NNs) are becoming increasingly larger and deeper, and large, deep NNs consume much more memory, so it is necessary to reduce memory consumed by such NNs. This is crucial especially in GPU training because the GPU memory is typically very small.

SUMMARY

According to an aspect of the present invention, a computer-implemented method is provided for reducing a consumption of a memory used for a propagation process for a deep neural network having fixed structures for computation order and node data dependency. The memory includes a plurality of memory segments for allocating to a plurality of nodes. The method includes collecting, in a neural network training iteration, information for each of the plurality of nodes relating to an allocation, a size, and a lifetime thereof. The method further includes choosing, from among the plurality of nodes, a first node having a maximum memory size relative to remaining ones of the nodes, responsive to the information. The method also includes choosing, from among the plurality of nodes, a second node which is non-overlapped with the lifetime of the first node, responsive to the information. The method additionally includes choosing one or more other nodes which are non-overlapped with the lifetime of the first node, responsive to a sum of memory sizes of the second node and the one or more other nodes not exceeding a memory size of the first node. The method further includes reallocating, by a processor, a memory segment allocated to the first node to the second node and the one or more other nodes to be reused by the second node and the one or more other nodes to reduce the consumption of the memory.

According to another aspect of the present invention, a computer program product is provided for reducing a consumption of a memory used for a propagation process for a deep neural network having fixed structures for computation order and node data dependency. The memory includes a plurality of memory segments for allocating to a plurality of nodes. The computer program product includes a non-transitory computer readable storage medium having program instructions embodied therewith. The program instructions are executable by a computer having the memory to cause the computer to perform a method. The method includes collecting, in a neural network training iteration, information for each of the plurality of nodes relating to an allocation, a size, and a lifetime thereof. The method further includes choosing, from among the plurality of nodes, a first node having a maximum memory size relative to remaining ones of the nodes, responsive to the information. The method also includes choosing, from among the plurality of nodes, a second node which is non-overlapped with the lifetime of the first node, responsive to the information. The method additionally includes choosing one or more other nodes which are non-overlapped with the lifetime of the first node, responsive to a sum of memory sizes of the second node and the one or more other nodes not exceeding a memory size of the first node. The method further includes reallocating, by the processor, a memory segment allocated to the first node to the second node and the one or more other nodes to be reused by the second node and the one or more other nodes to reduce the consumption of the memory.

According to yet another aspect of the present invention, a computer system is provided for reducing a consumption of a memory of the computer system used for a propagation process for a deep neural network having fixed structures for computation order and node data dependency. The memory includes a plurality of memory segments for allocating to a plurality of nodes. The computer system further includes a processor. The processor is configured to collect, in a neural network training iteration, information for each of the plurality of nodes relating to an allocation, a size, and a lifetime thereof. The processor is further configured to choose, from among the plurality of nodes, a first node having a maximum memory size relative to remaining ones of the nodes, responsive to the information. The processor is also configured to choose, from among the plurality of nodes, a second node which is non-overlapped with the lifetime of the first node, responsive to the information. The processor is additionally configured to choose one or more other nodes which are non-overlapped with the lifetime of the first node, responsive to a sum of memory sizes of the second node and the one or more other nodes not exceeding a memory size of the first node. The processor is further configured to reallocate a memory segment allocated to the first node to the second node and the one or more other nodes to be reused by the second node and the one or more other nodes to reduce the consumption of the memory.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to memory reduction for neural networks (NNs) with fixed structures.

As used herein, the term "fixed structures" refers to fixed structures of computation order and node data dependency for forward propagation and back propagation processes. Thus, neural networks with fixed structures can include, but are not limited to, Convolutional Neural Networks (CNNs), and so forth.

In an embodiment, the present invention can involve using dynamic profiling results for scheduling memory allocation. The memory allocation scheduling can be for any of forward propagation and back propagation in the neural network, and can involve any of, for example, but not limited to, activation functions, feature maps, and so forth, as readily appreciated by one of ordinary skill in the art, given the teachings of the present invention provided herein.

Compared with a graph analysis based approach to memory reduction, the present invention has at least the following two advantages: (1) the present invention splits large memory into pieces of memory such that two or more nodes with overlapped lifetimes use the pieces; and (2) the present invention can be applied even when NNs are constructed during forward propagation (the graph analysis based approach cannot be), so implementing the present invention is easier in frameworks (e.g., Chainer®) that allow such NN construction.

Compared with a memory pool based approach to memory reduction, the present invention can avoid cases in which memory would not be fully reused when memory requested early is smaller than memory requested later, which can happen in a memory pool based approach.

Figure 1:
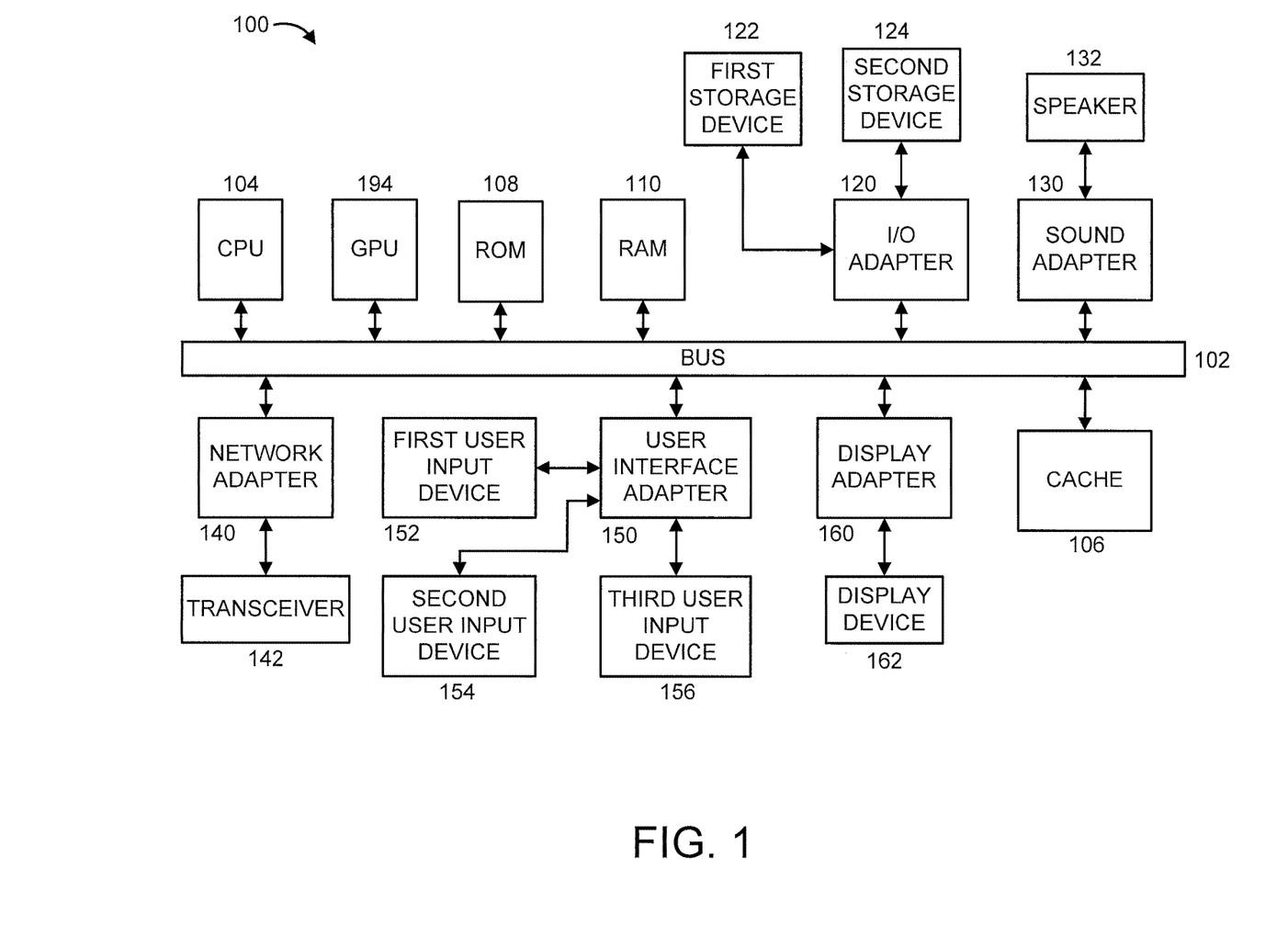
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102. Any of the CPU 104 or the GPU 194 can include and/or interface with a memory controller (see, e.g., FIG. 2) for implementing various aspects of the present invention.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
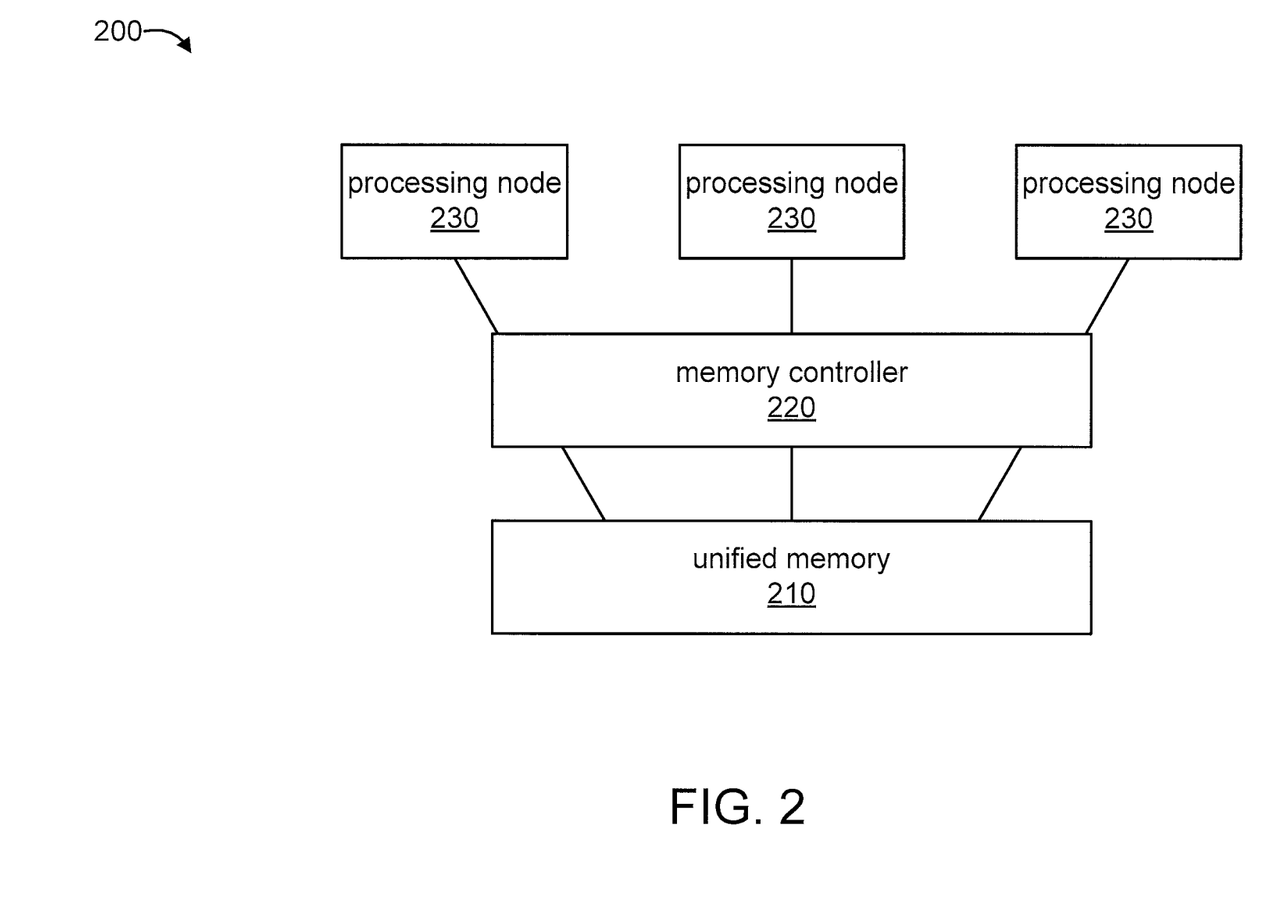
FIG. 2 is a block diagram showing another exemplary computer system to which the present invention can be applied, in accordance with an embodiment of the present invention.

Moreover, it is to be appreciated that system 200 described below with respect to FIG. 2 is a system that can be used to implement respective embodiments of the present invention. Part or all of processing system 100 may be included in one or more elements of system 200.

Figure 3:
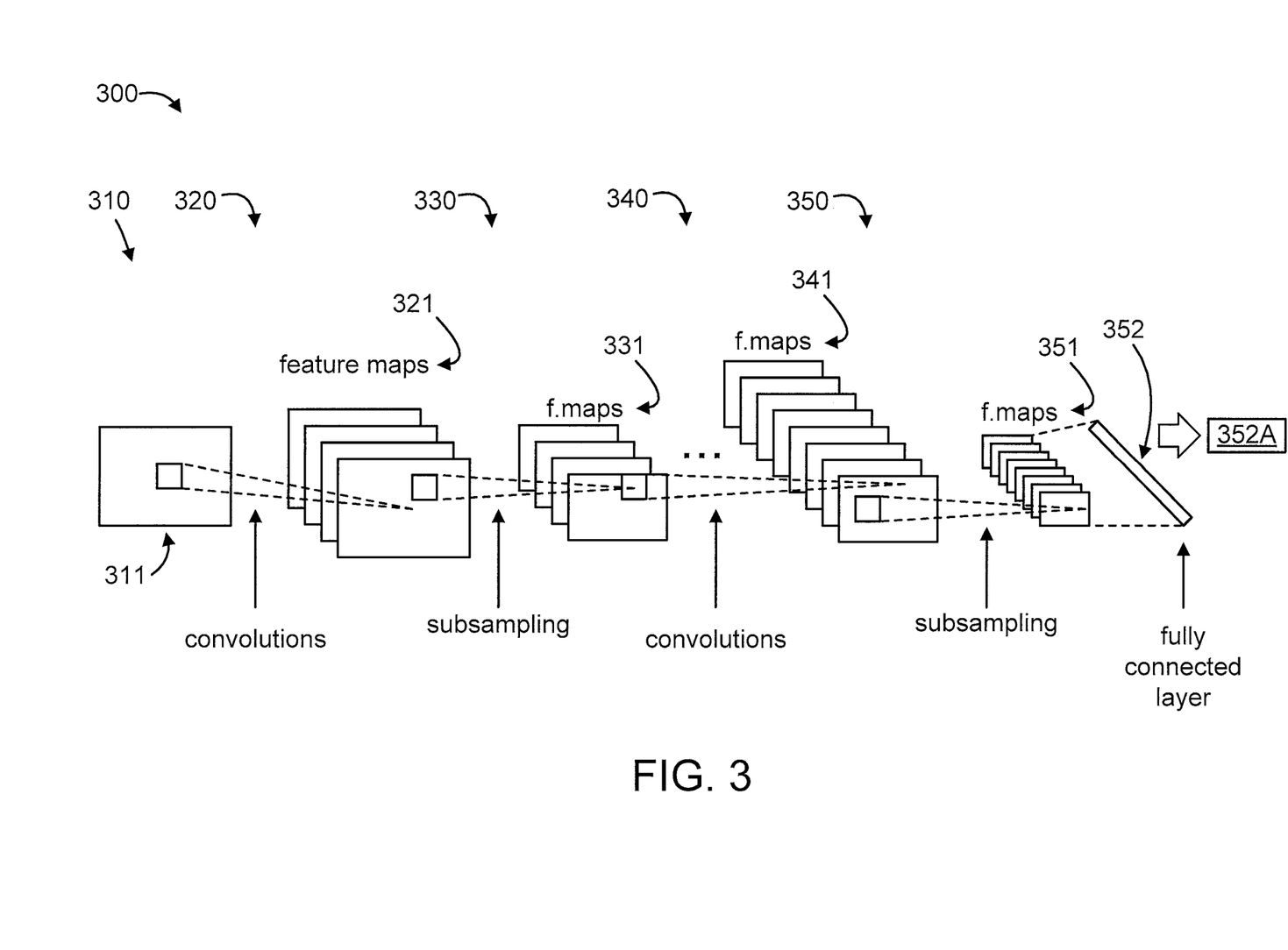
FIG. 3 is a block diagram showing an exemplary Convolutional Neural Network to which the present invention can be applied, in accordance with an embodiment of the present invention.
Figure 4:
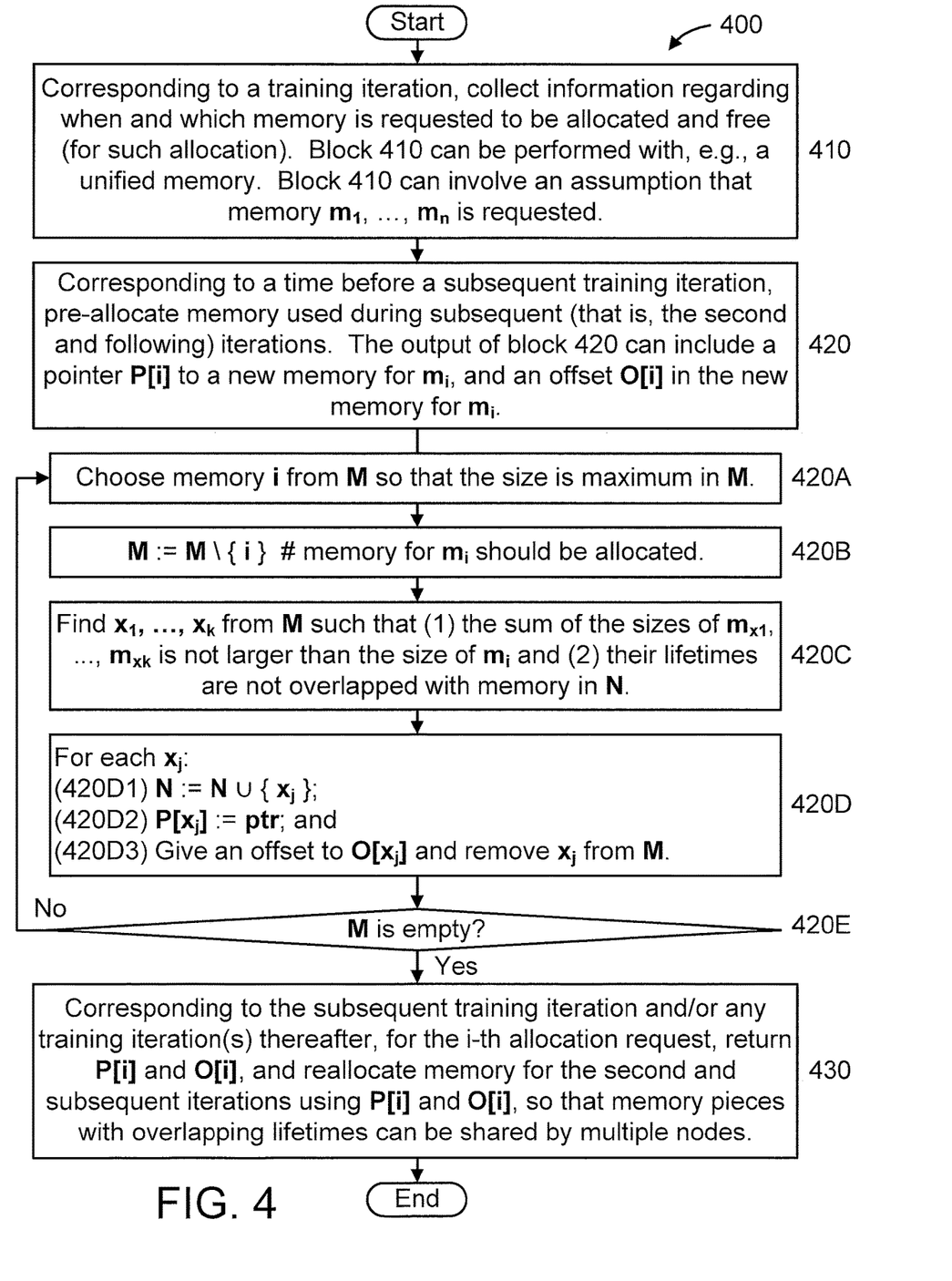
FIG. 4 is a flow diagram showing an exemplary method for memory reduction for neural networks with fixed structures, in accordance with an embodiment of the present invention.

Further, it is to be appreciated that processing system 100 may perform at least part of the method described herein including, for example, at least part of method 300 of FIG. 3 and/or at least part of method 400 of FIG. 4. Similarly, part or all of system 200 may be used to perform at least part of method 300 of FIG. 3 and/or at least part of method 400 of FIG. 4.

In the embodiment shown in FIG. 1, the elements thereof are interconnected by a bus(es)/network(s) 102. However, in other embodiments, other types of connections can also be used. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 1 can be implemented in a cloud configuration including, for example, in a distributed configuration. Additionally, one or more elements in FIG. 1 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 100 are readily determined by one of ordinary skill in the art, given the teachings of the present invention provided herein, while maintaining the spirit of the present invention.

FIG. 2 is a block diagram showing another exemplary computer system 200 to which the present invention can be applied, in accordance with an embodiment of the present invention.

The system 200 includes a unified memory (hereinafter "memory" in short) 210, a memory controller 220, and a set of processing nodes 230. Memory segments of the memory 210 can be allocated to various ones of the processing nodes 230 using the present invention.

It is to be appreciated that the set of processing nodes 230 can be implemented in a single computing system having multiple processing units (also referred to herein as "nodes") or can be implemented in a distributed computing system having multiple processing units.

The memory controller 220 receives memory requests from processing nodes 230 and allocates memory segments in the memory 210 in response thereto. The method for memory allocation used by the present invention is described in further detail herein below.

FIG. 3 is a block diagram showing an exemplary Convolutional Neural Network (CNN) 300 to which the present invention can be applied, in accordance with an embodiment of the present invention. It is to be appreciated that the elements of the CNN 300 are not necessarily drawn to scale, noting that feature map size typically decreases with depth. Moreover, while a CNN is shown for the sake of illustration, other types of neural networks can also be used, while maintaining the spirit of the present invention.

At step 310, receive an input image 311.

At step 320, perform convolutions on the input image 311 to obtain feature maps 321.

At step 330, perform sub-sampling on the feature maps 321 to obtain a set of f.maps 331.

At step 340, perform convolutions on the set of f.maps 331 to obtain another set of f.maps 341.

It is to be appreciated that each of the convolutional layers includes a set of learnable filters (also referred to as "kernels") which have a small receptive field. During the forward propagation pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

At step 350, perform sub-sampling on the other set of f.maps 341 to obtain yet another set of f.maps 351 that form a fully connected layer 352. The fully connected layer 352 provides an output 352A.

It is to be appreciated that the neurons in the fully connected layer 352 have full connections to all activations in the previous layer. Their activations can hence be computed with a matrix multiplication followed by a bias offset.

We can optionally have more fully connected layers rather than just 352 and more repeated steps of 320 and 330 rather than just 340 and 350 depending on different tasks.

It is to be further appreciated that while a single image is mentioned with respect to step 310, multiple images such as in the case of one or more video sequences can be input and processed in accordance with the method 300 of FIG. 3, while maintaining the spirit of the present invention.

These and other variations can be implemented in a convolutional neural network to which the present invention can be applied. Moreover, as noted above, the present invention can be applied to other any neural network with fixed structures for computation order and data dependency, while maintaining the spirit of the present invention.

Memory management is a form of resource management that is applied to computer memory. Memory management is used to provide ways to dynamically allocate portions of memory to programs at their request, and free the memory for reuse when the portions of memory are no longer needed by the requesting program. This is critical to any advanced computer system where more than a single process may be underway at any time. The present invention is directed to reducing the amount of memory used in a computer processing system when the computer processing system is performing any of forward propagation or back propagation processes for a neural network. In this way, overall computer performance can be improved.

FIG. 4 is a flow diagram showing an exemplary method 400 for memory reduction for neural networks with fixed structures, in accordance with an embodiment of the present invention.

Essentially, method 400 selects memory that can be shared by observing dynamic memory allocation/free operations, choosing nodes based on various criteria determined from memory observations (collected information), and reallocating a memory area to be reused until non-overlapped allocated memories are undetectable from the observations. The method can be applied to any of the layers of a neural network having fixed structures as described herein, including convolution layers, fully connected layers, and so forth.

At block 410, corresponding to a training iteration, collect information regarding when and which memory is requested to be allocated and freed (from being allocated). In an embodiment, block 410 can be performed with, e.g., a unified memory. In an embodiment, block 410 can involve an assumption that memory $m_1, \ldots, m_n$ is requested. In an embodiment, the training iteration implicated by block 410 can be the first training iteration or a subsequent training iteration to the first training iteration.

At block 420, corresponding to a time before a subsequent training iteration, pre-allocate memory used during subsequent (that is, the second and following) iterations. The subsequent training iteration implicated by block 420 is subsequent to whichever training iteration is implicated by block 410. Hence, if the training iteration implicated by block 410 is the first training iteration, then the subsequent training iteration implicated by block 420 can be the second or any training iteration thereafter. As another example, if the training iteration implicated by block 410 is the fourth training iteration, then the subsequent training iteration implicated by block 420 can be the fifth or later training iteration. The bottom line is that whichever training iteration is implicated by block 420 will be subsequent to the training iteration implicated by block 410.

In an embodiment, the output of block 420 can include a pointer P[i] to a new memory for $m_i$, and an offset O[i] in the new memory for $m_i$.

In an embodiment, the following definitions can apply:

M:={1, . . . n} # i∈M if memory for $m_i$ is not allocated yet;

i:=Chosen from M so that the size of $m_i$ is maximum;

ptr=P[i]:=Allocate memory with the same size as $m_i$;

O[i]:=0; and

N:={i} # a set of memory sharing ptr.

In an embodiment, block 420 can include one or more of blocks 420A-D.

At block 420A, choose memory i from M so that the size is maximum in M.

At block 420B, M:=M\{i} # memory for $m_i$ should be allocated

At block 420C, find $x_1, \ldots, x_k$ from M such that (1) the sum of the sizes of $m_{x1}, \ldots, m_{xk}$ is not larger than the size of $m_i$ and (2) their lifetimes are not overlapped with memory in N. In an embodiment, $x_1, \ldots, x_k$ denote memory pieces (aka segments) that a larger memory piece/segment can be split into.

At block 420D, for each $x_j$:
(420D1) $N := N \cup \{x_j\}$;
(420D2) $P[x_j] := ptr$;
(420D3) Give an offset to $O[x_j]$, and remove $x_j$ from M; and
(420D4) Determine whether M is empty. If so, then proceed to block 430. Otherwise, return to block 420A.

At block 430, corresponding to the subsequent training iteration and/or any training iteration(s) thereafter, for the i-th allocation request, return P[i] and O[i], and reallocate memory for the second and subsequent iterations using P[i] and O[i] so that memory pieces with overlapping lifetimes can be shared by multiple nodes.

Figure 5:
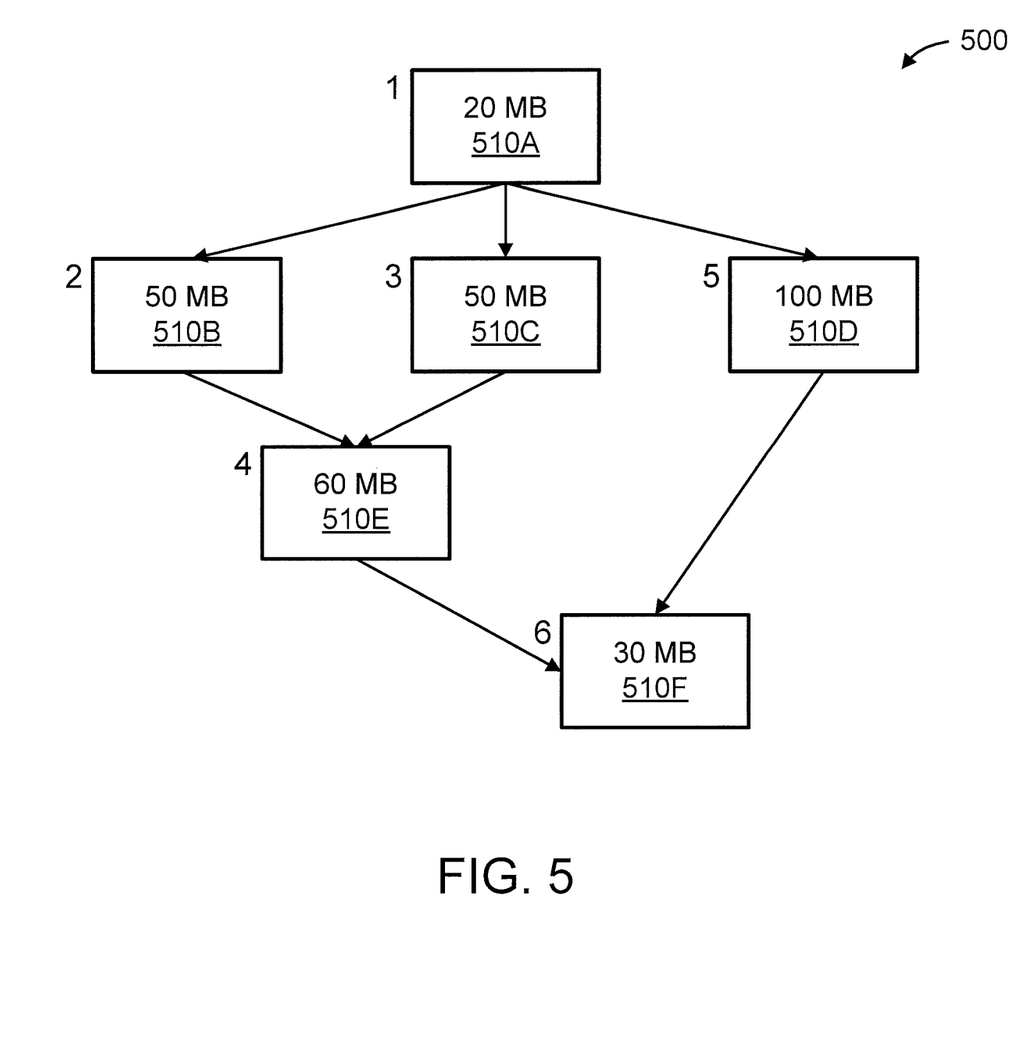
FIG. 5 is a block diagram showing an exemplary memory structure to which the present invention can be applied, in accordance with an embodiment of the present invention.

FIG. 5 is a block diagram showing an exemplary memory structure 500 to which the present invention can be applied, in accordance with an embodiment of the present invention.

The memory structure 500 includes six pieces of memory 500A-F, also numbered by integers and interconnected by arrows to show a computation order and a data dependency, respectively, for the six pieces of memory 500A-F. Each of the pieces of memory 500A-F can be considered to correspond to $m_1, \ldots, m_6$ in relation to method 400 of FIG. 4.

In an embodiment, the present invention may split the large memory (100 MB, that is memory 500D) into smaller pieces (e.g., the two pieces that are each 50 MB, that is memory pieces 500C and 500D) so that the pieces can be used by nodes with overlapped lifetimes. The nodes can correspond to nodes of the layers of the neural network.

In the example of FIG. 5, the computation order is as follows: (1) 510A; (2) 510B; (3) 510C; (4) 510E; (5) 510D; and (6) 510F.

Figure 6:
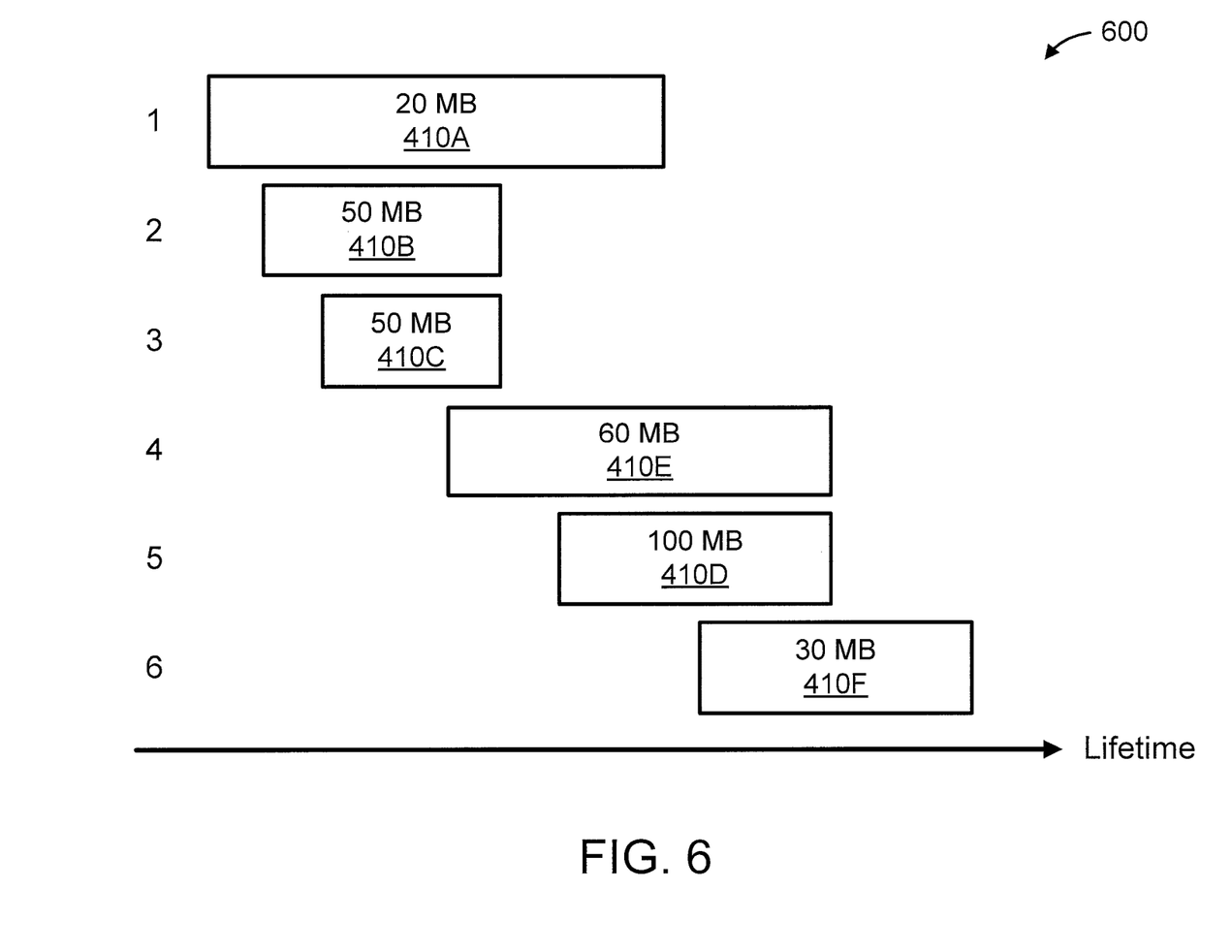
FIG. 6 is a block diagram showing an exemplary observation sequence relating to the memory structure of FIG. 5, in accordance with an embodiment of the present invention.

FIG. 6 is a block diagram showing an exemplary observation sequence 600 relating to the memory structure 500 of FIG. 5, in accordance with an embodiment of the present invention. The observation sequence 600 relates to observing dynamic memory allocation/free operations with respect to the memory pieces shown in FIG. 5.

The observation sequence 600 is essentially shown in a graph format, with the x-axis corresponding to memory lifetime and the y-axis corresponding to the ordering of the observations.

The observation sequence 600 makes it readily ascertainable regarding which memory pieces overlap with respect to each other and which do not overlap with respect to each other. For example, it is clear that the lifetimes of the 20 MB memory (510A) and the 30 MB memory (510F) do not overlap. It is further clear that the lifetimes of the 50 MB memories (510B and 510C) do overlap.

Figure 7:
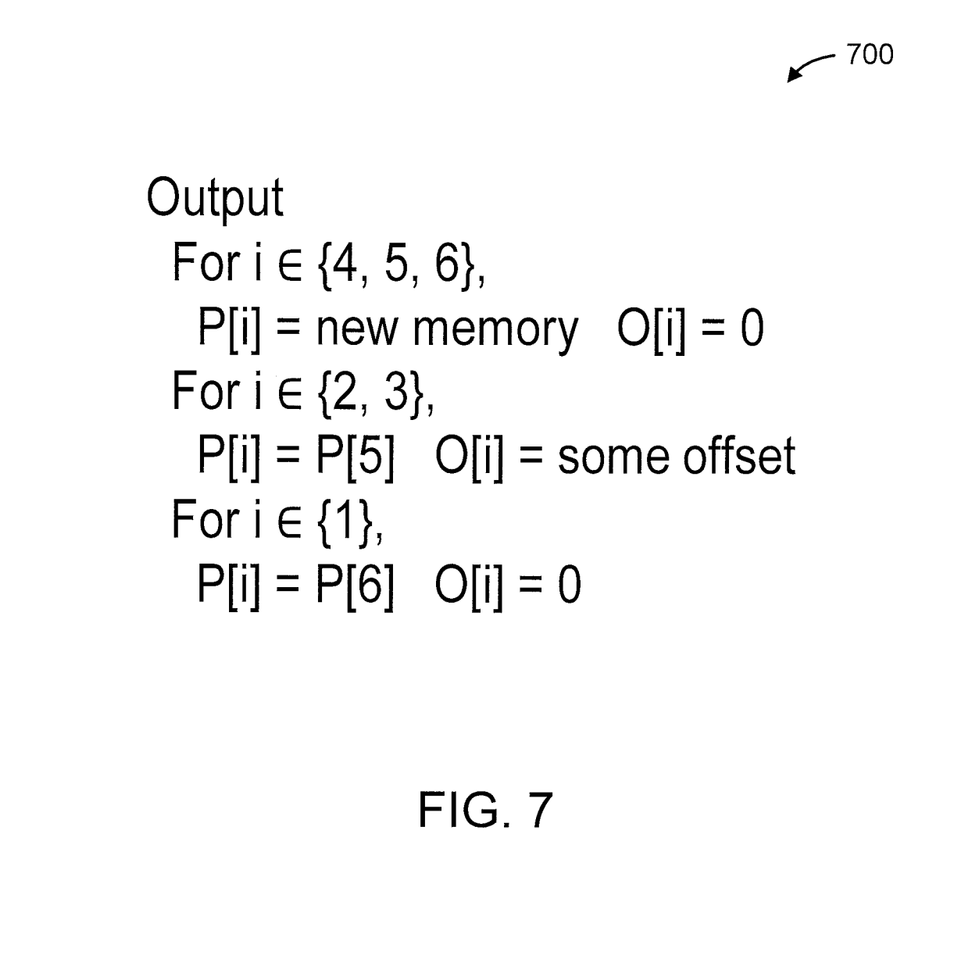
FIG. 7 is a diagram showing an exemplary output, in accordance with an embodiment of the present invention.

FIG. 7 is a diagram showing an exemplary output 700, in accordance with an embodiment of the present invention.

While a particular arrangement is shown of the output 700, it is to be appreciated that the present invention is not limited to the same and, thus, other arrangements can also be used, while maintaining the spirit of the present invention.

In the output 700, pointers P[i] and offsets O[i] are provided for each of the memory pieces 510A-510F (e.g., $m_1, \ldots, m_6$).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reducing a consumption of a memory used for a propagation process for a deep neural network having fixed structures for computation order and node data dependency, the memory including a plurality of memory segments for allocating to a plurality of nodes, the method comprising:

collecting, in a neural network training iteration, information for each of the plurality of nodes relating to a memory allocation including an allocated memory size and a memory allocation lifetime of the memory allocation;

choosing, from among the plurality of nodes, a first node having a maximum allocated memory size relative to remaining ones of the nodes, responsive to the information;

choosing, from among the plurality of nodes, a second node whose memory allocation lifetime is non-overlapped with the memory allocation lifetime of the first node, responsive to the information;

choosing one or more other nodes whose memory allocation lifetimes are non-overlapped with the memory allocation lifetime of the first node, responsive to a sum of allocated memory sizes of the second node and the one or more other nodes not exceeding an allocated memory size of the first node; and reallocating, by a processor in a subsequent neural network training iteration, a memory segment allocated to the first node to the second node and the one or more other nodes to be reused by the second node and the one or more other nodes to reduce the consumption of the memory.

2. The computer-implemented method of claim 1, further comprising repeating the choosing and reallocating steps until non-overlapped allocated memories are undetectable from the information.

3. The computer-implemented method of claim 1, wherein the propagation process is a forward propagation process.

4. The computer-implemented method of claim 1, wherein the propagation process is a back propagation process.

5. The computer-implemented method of claim 1, wherein the NN is a convolutional neural network.

6. The computer-implemented method of claim 1, wherein the propagation process uses the memory to store a temporary workspace, and the method reduces the consumption of the memory used to store the temporary workspace.

7. The computer-implemented method of claim 1, wherein the propagation process uses the memory to store activations and feature maps, and the method reduces the consumption of the memory used to store the activations and the feature maps.

8. The computer-implemented method of claim 1, wherein said reallocating step further comprises generating a pointer to, and an offset for, the second node and the one or more other nodes in the memory.

9. The computer-implemented method of claim 1, wherein the memory is a unified memory.

10. The computer-implemented method of claim 1, wherein said reallocating step is performed prior to a runtime using the second node and the one or more other nodes.

11. A computer program product for reducing a consumption of a memory used for a propagation process for a deep neural network having fixed structures for computation order and node data dependency, the memory including a plurality of memory segments for allocating to a plurality of nodes, the computer program product comprising a non-transitory computer readable storage medium having program instructions embodied therewith, the program instructions executable by a computer having the memory to cause the computer to perform a method comprising:
  collecting, in a neural network training iteration, information for each of the plurality of nodes relating to a memory allocation including an allocated memory size and a memory allocation lifetime of the memory allocation;
  choosing, from among the plurality of nodes, a first node having a maximum allocated memory size relative to remaining ones of the nodes, responsive to the information;
  choosing, from among the plurality of nodes, a second node whose memory allocation lifetime is non-overlapped with the memory allocation lifetime of the first node, responsive to the information;
  choosing one or more other nodes whose memory allocation lifetimes are non-overlapped with the memory allocation lifetime of the first node, responsive to a sum of allocated memory sizes of the second node and the one or more other nodes not exceeding an allocated memory size of the first node; and
  reallocating, by a processor in a subsequent neural network training iteration, a memory segment allocated to the first node to the second node and the one or more other nodes to be reused by the second node and the one or more other nodes to reduce the consumption of the memory.

12. The computer-implemented method of claim 11, wherein the method further comprises repeating the choosing and reallocating steps until non-overlapped allocated memories are undetectable from the information.

13. The computer-implemented method of claim 11, wherein the propagation process is a forward propagation process.

14. The computer-implemented method of claim 11, wherein the propagation process is a back propagation process.

15. The computer-implemented method of claim 11, wherein the NN is a convolutional neural network.

16. The computer-implemented method of claim 11, wherein the propagation process uses the memory to store a temporary workspace, and the method reduces the consumption of the memory used to store the temporary workspace.

17. The computer-implemented method of claim 11, wherein the propagation process uses the memory to store activations and feature maps, and the method reduces the consumption of the memory used to store the activations and the feature maps.

18. The computer-implemented method of claim 11, wherein said reallocating step further comprises generating a pointer to, and an offset for, the second node and the one or more other nodes in the memory.

19. A computer system for reducing a consumption of a memory of the computer system used for a propagation process for a deep neural network having fixed structures for computation order and node data dependency, the memory including a plurality of memory segments for allocating to a plurality of nodes, the computer system further comprising:
  a processor configured to
    collect, in a neural network training iteration, information for each of the plurality of nodes relating to a memory allocation including an allocated memory size and a memory allocation lifetime of the memory allocation;
    choose, from among the plurality of nodes, a first node having a maximum allocated memory size relative to remaining ones of the nodes, responsive to the information;
    choose, from among the plurality of nodes, a second node whose memory allocation lifetime is non-overlapped with the memory allocation lifetime of the first node, responsive to the information;
    choose one or more other nodes whose memory allocation lifetimes are non-overlapped with the memory allocation lifetime of the first node, responsive to a sum of allocated memory sizes of the second node and the one or more other nodes not exceeding an allocated memory size of the first node; and
    reallocate, in a subsequent neural network training iteration, a memory segment allocated to the first node to the second node and the one or more other nodes to be reused by the second node and the one or more other nodes to reduce the consumption of the memory.

20. The computer system of claim 19, wherein the memory is comprised in a Graphics Processing Unit.

* * * * *